United States Patent
Yamamoto et al.

[11] Patent Number: 5,899,311
[45] Date of Patent: May 4, 1999

[54] APPARATUS FOR HOLDING SPRING OF CLUTCH

[75] Inventors: Shusuke Yamamoto; Michikiyo Hiasa; Hiroshi Yabe, all of Shizuoka-ken, Japan

[73] Assignees: Kabushiki Kaisha Yutaka Giken, Hamamatsu; NSK-Warner Kabushiki Kaisha, Tokyo, both of Japan

[21] Appl. No.: 08/910,108

[22] Filed: Aug. 13, 1997

[30] Foreign Application Priority Data

Aug. 15, 1996 [JP] Japan ................................ 8-215664

[51] Int. Cl.$^6$ ................................. F16H 45/02; F16D 3/14
[52] U.S. Cl. ..................... 192/205; 192/3.29; 192/55.61
[58] Field of Search ................. 192/205, 3.28, 192/3.29, 3.3, 212, 55.61; 464/66, 98

[56] References Cited

U.S. PATENT DOCUMENTS

| | | | |
|---|---|---|---|
| 4,890,706 | 1/1990 | Miura et al. ..................... | 192/3.29 X |
| 5,203,835 | 4/1993 | Kohno et al. ..................... | 192/3.28 X |
| 5,772,515 | 6/1998 | Yamakawa et al. ................. | 192/303 X |

FOREIGN PATENT DOCUMENTS

| | | |
|---|---|---|
| 62-9780 | 3/1987 | Japan . |
| 2-53558 | 4/1990 | Japan . |
| 5-71612 | 3/1993 | Japan . |
| 6-43865 | 6/1994 | Japan . |
| 6-48017 | 6/1994 | Japan . |
| 7-167212 | 7/1995 | Japan . |
| 2123906 | 2/1984 | United Kingdom .................. 192/3.29 |
| 2144495 | 3/1995 | United Kingdom .................. 192/3.29 |

*Primary Examiner*—Charles A. Marmor
*Assistant Examiner*—Ankur Parekh
*Attorney, Agent, or Firm*—Armstrong, Westerman, Hattori, McLeland & Naughton

[57] ABSTRACT

An apparatus for holding a spring of a clutch has a guide plate which is disposed in an annular recessed portion on a rear side of a clutch plate. A coil spring circumferentially extends in contact with the guide plate. A retainer has a pair of end surface holding portions to contact both ends of the coil spring and a peripheral holding portion to contact a periphery of the coil spring. The guide plate and the retainer are mounted on the clutch plate. A connecting piece is continuously provided on each circumferential end of the guide plate such that the connecting pieces are fit onto the end surface holding portions of the retainer.

7 Claims, 5 Drawing Sheets

PRIOR ART
FIG. 12A
PRIOR ART
FIG. 12B
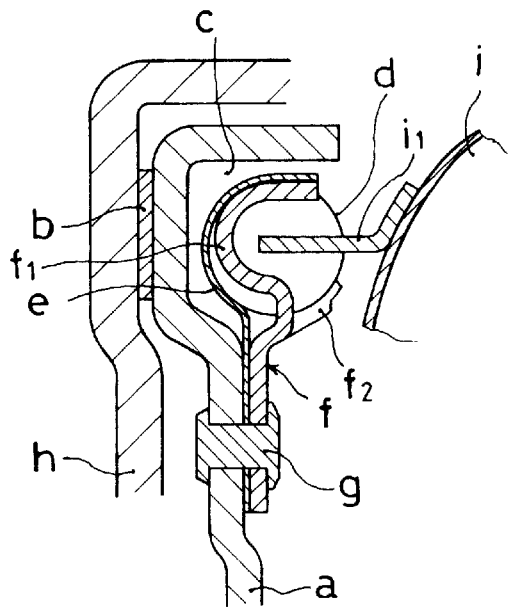
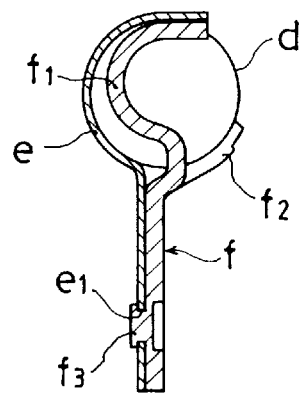
PRIOR ART
FIG. 13
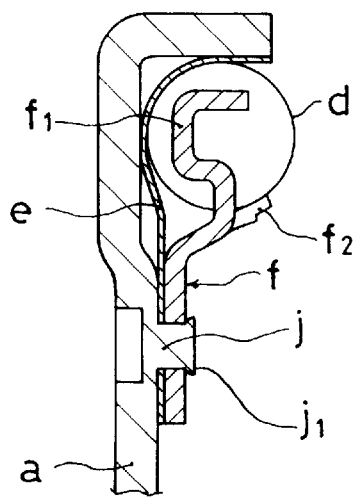

APPARATUS FOR HOLDING SPRING OF CLUTCH

BACKGROUND OF THE INVENTION

1. Field of the Invention

The present invention relates to an apparatus for holding springs of a clutch, particularly to shock-absorbing springs for a clutch plate which are used in a direct-coupling clutch of a fluid torque converter, or the like.

2. Description of the Related Art

A direct-coupling clutch for a fluid torque converter is disclosed, for example, in Published Examined Patent Application No. 9780/1987. An apparatus for holding shock-absorbing springs in this direct-coupling clutch has a construction shown in FIG. 12A. In the figure, reference mark "a" is a clutch plate. On a front side (i.e., left side in FIG. 12A) of the clutch plate "a", there is adhered a friction member b. On a rear side (i.e., right side in FIG. 12A) thereof, there is formed an annular recessed portion c. A shock-absorbing spring d is held inside this recessed portion c by means of a wear-resistant guide plate e and a retainer f. The retainer f has end surface holding portions $f_1$ for holding both end portions of the spring d, and periphery holding portions $f_2$ for holding the periphery thereof. The retainer f is fixed to the clutch plate "a" with rivets g after overlapping it with the guide plate e. In the figure, reference mark h is an input case, i is a turbine, and $i_1$ are projection pieces which extend from the turbine i to abut with both ends of the spring d.

In this apparatus, as shown in FIG. 12B, prior to fixing with rivets g, the guide plate e and the retainer f are assembled in advance by caulking a small projection $f_3$ which protrudes or projects from the retainer f into a small hole $e_1$ which is provided in the guide plate e. However, the guide plate e is likely to give rise to distortions because it is made of a thin plate and is further heat-treated. Therefore, the portion which is overlapped with the retainer f presents remarkable distortions because it is planar and is wide in lateral width. Consequently, it sometimes happens that a clearance occurs between the guide plate e and the retainer f in a portion away from the portion that is caulked by the small projection $f_3$. Even if the pre-assembled parts are caulked onto the clutch plate "a" with rivets g as shown in FIG. 12A, the above-described distortion will remain, resulting in a disadvantage in that there will be left a clearance between the guide plate "a" and the retainer f or the clutch plate e.

Further, in order to minimize the number of parts, it is considered to make the arrangement, as shown in FIG. 13, that a small projection j is provided in a clutch plate "a" and that the guide plate e and the retainer f are caulked at the same time without pre-assembling them. However, it is considerably difficult to protrude or project the small projection j into a height enough to caulk the guide plate e and the retainer f together. In addition, the guide plate e may be distorted to thereby increase in height. As a result, the height of the small projection j is likely to become insufficient in plate thickness at a caulking head portion $j_1$. Further, due to the distortion in the guide plate e, the clearance as described above is likely to remain between respective plates.

The present invention has an object of providing an apparatus for holding a spring of a clutch in which the retainer can be mounted on the clutch plate without giving rise to a clearance.

SUMMARY OF THE INVENTION

In order to attain the above and other objects, the present invention is an apparatus for holding a spring of a clutch comprising: a guide plate which is disposed in an annular recessed portion on a rear side of a clutch plate; a coil spring which circumferentially extends in contact with the guide plate; and a retainer which has a pair of end surface holding portions to contact both ends of the coil spring, and a peripheral holding portion to contact a periphery of the coil spring, the guide plate and the retainer being mounted on the clutch plate; wherein a connecting piece is integrally provided on each circumferential end of the guide plate such that the connecting pieces are fit onto the end surface holding portions of the retainer.

According to this apparatus, the retainer and the guide plate are fixed together by fitting the connecting pieces of the guide plate onto the end surface holding portions. Therefore, the guide plate which is likely to be subject to distortion at the time of heat-treatment can be fixed into position without pinching it at the fixing portion of the clutch plate and the retainer. As a result, there occurs no clearance at this fixing portion.

Preferably, each of the end surface holding portions of the retainer is formed into a groove-shaped end surface holding portion which is open on the rear side, the groove-shaped end surface holding portions each having small projections of different directions formed on an external surface thereof and each of the connecting pieces of the guide plate is formed into a shape for fitting onto each of the groove-shaped end surface holding portions, the connecting pieces each having small holes (or openings) to be respectively engaged with the small projections so as to connect the retainer and the guide plate together.

According to this arrangement, the engaging of the small projections with the small holes is added to the fitting portion of the connecting piece of the guide plate onto the groove-shaped end surface holding portion. Therefore, the connection becomes firmer.

Preferably, each of the end surface holding portions of the retainer is formed into a groove-shaped end surface holding portion which is open on the rear side, the groove-shaped end surface holding portion each having a notched portion on a diametrically outer side and inner side, respectively, and each of the connecting pieces of the guide plate is formed into a shape for fitting onto each of the groove-shaped end surface holding portions, the connecting piece having claw pieces to be respectively engaged with the notched portion so as to connect the retainer and the guide plate together.

According to this arrangement, the notched portions in the end surface holding portions of the retainer and the claw pieces of the connecting pieces of the guide plate can be formed simultaneously. Therefore, the machining is easy and the connection of the retainer and the guide plate becomes firmer as a result of this connection.

Preferably, each of the end surface holding portions of the retainer is formed into a trough-shaped end surface holding portion which is open on the rear side, and each of the connecting pieces of the guide plate is formed into a shape for fitting onto the trough-shaped end surface holding portion, the connecting pieces each having a bent portion to be engaged with an edge on diametrically outer side of the trough-shaped end surface holding portion so as to connect the retainer and the guide plate together.

According to this arrangement, the guide plate is engaged with the trough-shaped end surface holding portion having the bent portion which is provided in the connecting pieces. Therefore, the assembling becomes easier.

Preferably, a clearance is provided between a diametrically inner surface in the annular recessed portion on the rear side of the clutch plate and a diametrically outer portion of the guide plate. One of the small projections is formed to slightly protrude from a diametrically outer surface of the guide plate into said clearance. A balance weight (or a balance weight chip) having a small hole to be engaged with the small projection is inserted into the clearance to thereby engage the small hole with the small projection.

According to this arrangement, the balance weight that has been formed into a predetermined weight can be fixed only by inserting it into the clearance.

Preferably, the balance weight is formed into a plate spring of substantially U shape having a pair of parallelly extending leg pieces with the small holes on one of the leg portions, or else, the balance weight has a hook-shaped engaging claw on one end such that the engaging claw is engaged with the recess on the retainer which is formed by protrusion of the small projection.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 12A and 12B are sectional views of a conventional example; and

FIG. 13 is a sectional view of another conventional example.

DETAILED DESCRIPTION OF PREFERRED EMBODIMENTS

An explanation will now be made about preferred embodiments of the present invention with reference to the accompanying drawings.

Figure 1:
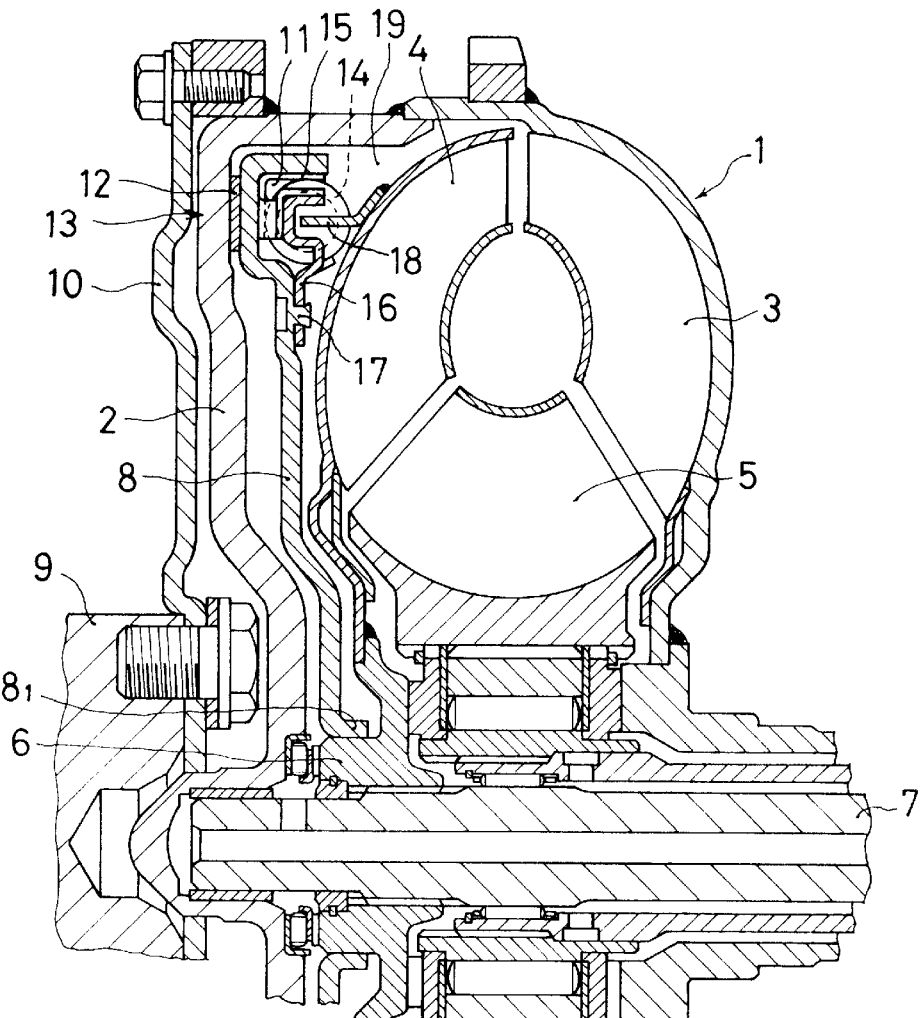
FIG. 1 is a vertical cross-sectional view of a torque converter showing one example of the present invention.

FIGS. 1 through 5 show one example of the present invention. in FIG. 1, reference numeral 1 denotes a fluid torque converter, reference numeral 2 denotes a front case of the fluid torque converter 1, and reference numeral 3 denotes a pump which is integral with the front case 2. Reference numeral 4 denotes a turbine and reference numeral 5 denotes a stator. The turbine 4 is connected by means of spline to an output shaft 7 at a boss portion 6. A boss portion $8_1$ of a clutch plate 8 is loosely fit to the boss portion 6. A crank shaft 9 of an engine is connected to the front case 2 via a torque transmission plate 10.

Figure 2:
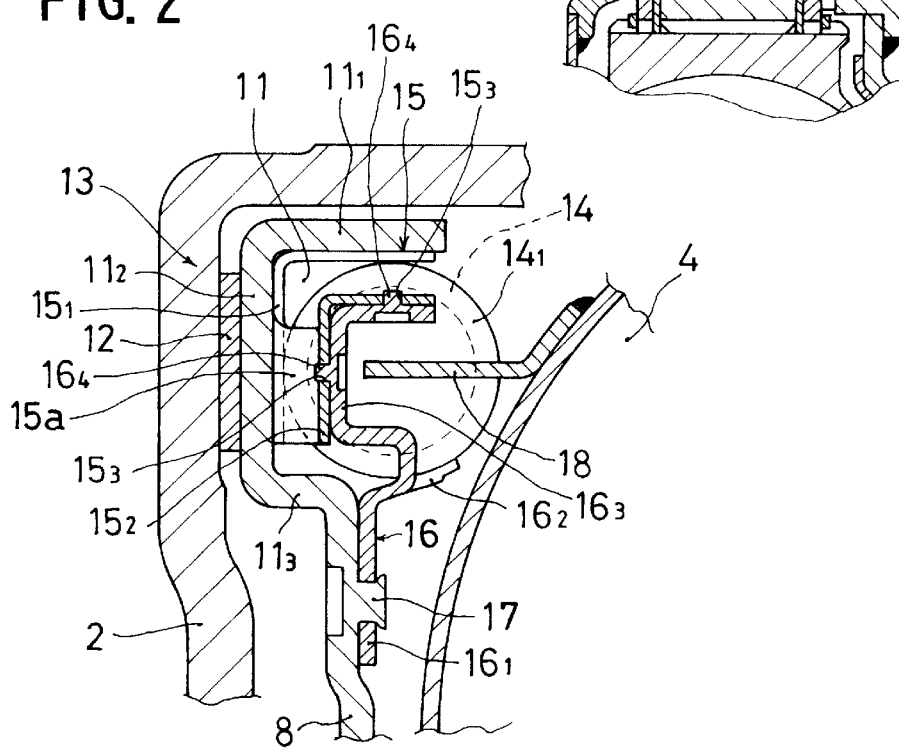
FIG. 2 is an enlarged view of an important portion of FIG. 1.

As shown in FIG. 2, the clutch plate 8 has on its periphery (or its diametrically outer side) an annular recessed portion 11 which is formed by an outer circumferential wall $11_1$, a front wall $11_2$, and an inner circumferential wall $11_3$ such that the annular recessed portion 11 is open to the rear side. (In this specification, the front side is defined to be on the left side as seen in FIG. 1 or 2, and the rear side is defined to be on the right side as seen in FIG. 1 or 2.) A friction member 12 is mounted on, or attached to, the front side of the clutch plate 8. The friction member 12 and the rear surface of the front case 2 constitute a friction clutch 13.

Inside the annular recessed portion 11, there are circumferentially disposed an appropriate number (or appropriate sets) of shock-absorbing coil springs 14 and end plates $14_1$ which are integral therewith. (Explanation will be made hereinbelow mainly about one set out of a plurality of sets contained in one clutch.) Between each coil spring 14 and the annular recessed portion 11, there is interposed a heat-treated wear-resistant guide plate 15 in order to prevent the friction on the surface of the recessed portion when the coil spring 14 is extended and contracted. Furthermore, a retainer 16 for retaining or holding the coil spring 14 inside the annular recessed portion 11 is fixedly mounted by means of protruding pins 17.

Figure 3:
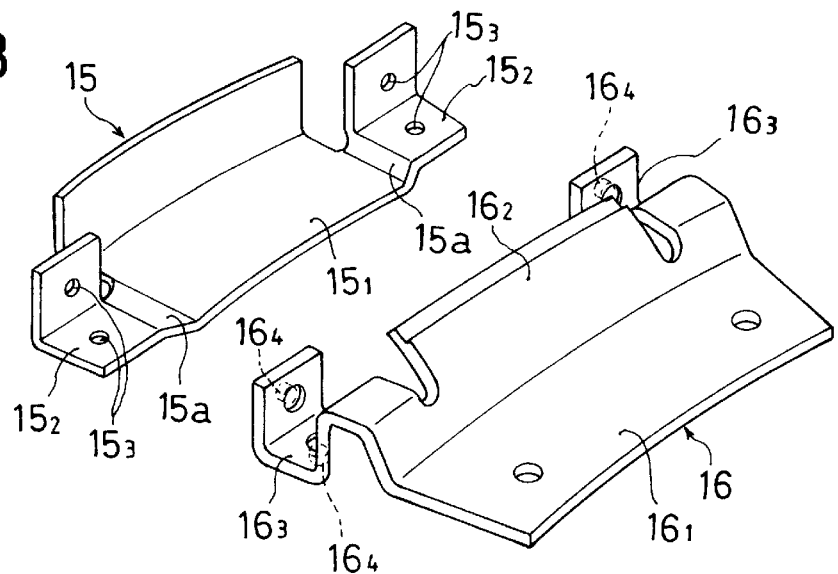
FIG. 3 is an exploded perspective view of an important portion thereof.
Figure 4A:
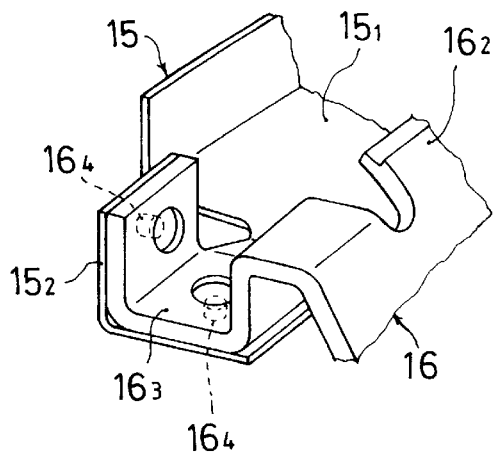
FIGS. 4A and 4B are perspective view and sectional view, respectively, of an important portion thereof.
Figure 4B:
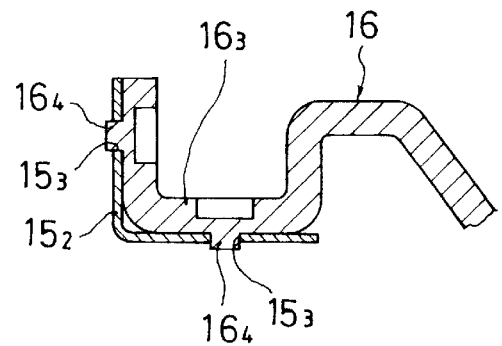

The guide plate 15 and the retainer 16 have the constructions as shown, for example, in FIGS. 3 and 4. The guide plate 15 is made up of an L-shaped main portion $15_1$ and L-shaped connecting pieces $15_2$ which are disposed on circumferentially both sides of the L-shaped main portion $15_1$. Each of the L-shaped connecting pieces $15_2$ is smaller than the L-shaped main portion $15_1$ and is provided so as to continuously extend from the main portion $15_1$ via a stepped portion 15a. Each of the L-shaped connecting pieces $15_2$ has a small hole $15_3$ on each of the planes of the L shape. The retainer 16 is made up of a mounting portion $16_1$ and a peripheral holding portion $16_2$ which is disposed in an inclined manner on diametrically outside of the mounting portion $16_1$. On circumferentially both sides of the peripheral holding portion $16_2$, there are provided groove-shaped end surface holding portions $16_3$ (i.e., portions to hold the end surfaces of the coil spring) which are substantially of shape. Each of this groove-shaped end surface holding portions $16_3$ is provided, by means of extrusion, with a small projection $16_4$ on its peripheral portion (i.e., on an external surface of an outer circumferential wall) and on its side portion (i.e., on the external surface of the bottom-side wall as seen in FIG. 3).

Figure 5:
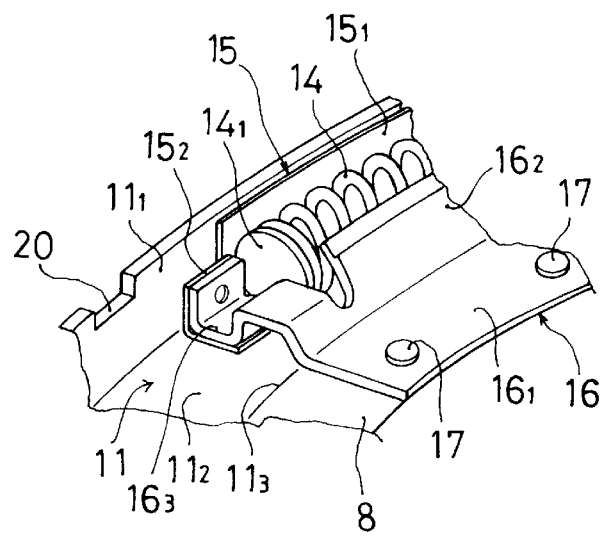
FIG. 5 is a perspective view showing an assembled condition of an important portion.

As shown in FIGS. 1 and 2, projection pieces 18 extend from the turbine 4 into an inside of each of the groove-shaped end surface holding portions $16_3$ so as to contact the end plates $14_1$ of the coil spring 14. When the pressure inside a space 19 has risen, the clutch plate 8 moves to the left (as seen in FIGS. 1 and 2) due to a pressure difference, whereby the clutch plate 13 is connected or engaged. Consequently, the rotation of the front case 2 is directly transmitted to the output shaft 7 via the clutch plate 8, the coil spring 14, the projection piece 18, and the turbine 4. In FIG. 5, a notched portion 20 represents a portion which is removed by cutting or shearing with a pressing machine at the time of correcting the dynamic balance of the fluid torque converter 1.

In this embodiment, each of the connecting pieces $15_2$ of the guide plate 15 is coupled by bringing into close contact with the outer surface of the groove-shaped end surface holding portions $16_3$ of the retainer 16 and by fitting the small projections $16_4$ into the small holes $15_3$. The guide plate 15 can therefore be surely connected to the retainer 16. The guide plate 15 can also be fixedly mounted in a predetermined positional relationship by coupling only the mounting portion $16_1$ of the retainer 16 to the clutch plate 8 by means of the protruding or projecting pins 17 which are extruded from the clutch plate 8.

In this manner, since the guide plate 15 is not interposed between the clutch plate 8 and the retainer 16, even if there is a distortion due to heat treatment, the guide plate 15 will not give an influence on the adhesion between the clutch plate 8 and the retainer 16. Both the members 8, 16 can thus be coupled in close contact with each other. In addition, the connecting pieces $15_2$ of the guide plate 15 are located on circumferentially both sides of the guide plate 15, and the size of the connecting pieces $15_2$ is small. Therefore, even if its position is deviated to some degree due to distortion, the connecting pieces $15_2$ can be adhered substantially closely to the outer surfaces of the groove-shaped end surface holding portions $16_3$ of the retainer 16, whereby the connecting pieces $15_2$ are fixed in this state. At this time, by caulking the protruded portions of the small projections $16_4$, the fixing force can be enhanced.

Figure 6A:
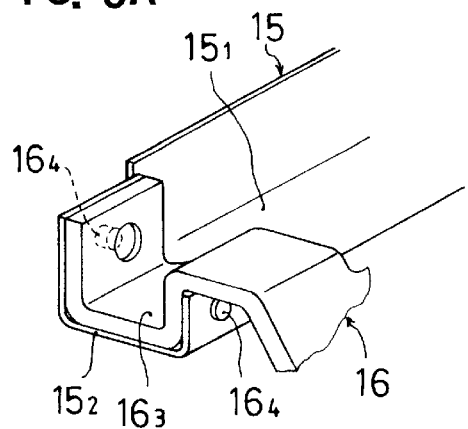
FIGS. 6A and 6B are perspective view and sectional view, respectively, showing another example of the present invention.
Figure 6B:
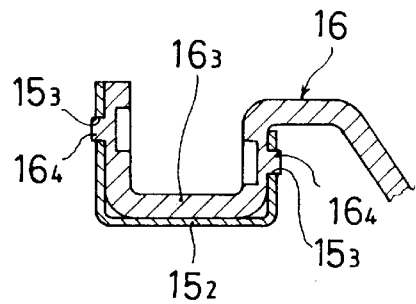

Now, in the embodiment shown in FIGS. 6A and 6B, the connecting piece $15_2$ of the guide plate 15 is formed into a substantially shape and is fit onto three planes of the groove-shaped end surface holding portions $16_3$. They are thus connected together by fitting small projections $16_4$ into small holes $15_3$ which are provided in two parallelly extending planes within the shape. When the connecting piece $15_2$ is to be fit onto the groove-shaped end surface holding portion $16_3$, the -shaped opening is expanded against the elastic force to thereby fit the small projections $16_4$ into the small holes $15_3$. Upon their fitting together, the expansion of the -shaped opening is restored back to its original state, so that the connecting piece $15_2$ and the groove-shaped end surface holding portion $16_3$ are brought into close contact with each other.

Also in this embodiment, since the guide plate 15 is connected to the retainer 16 via the connecting pieces $15_2$ on both circumferential ends, there is little or no possibility that the adhesion of the connecting pieces $15_2$ on both circumferential sides to the groove-shaped end surface holding pieces $16_3$ is impaired, even if the guide plate 15 has distortions to some degree. This is true also of the embodiments shown hereinbelow in FIGS. 7 through 11. If the front ends of the small projections $16_4$ are thereafter caulked to thereby hold the connecting piece $15_2$ down, the fixing becomes firmer.

Figure 7A:
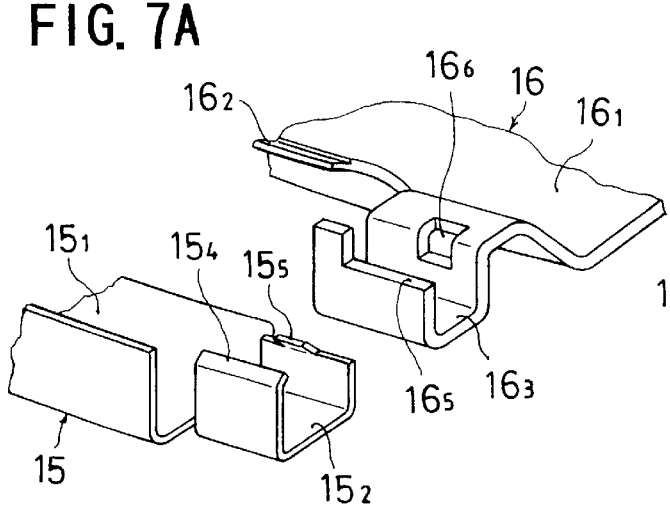
FIGS. 7A and 7B are exploded perspective view and sectional view of an example with a different engaging means.
Figure 7B:
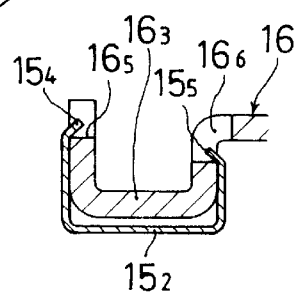

In the embodiment shown in FIGS. 7A and 7B, the connecting piece $15_2$ of the guide plate 15 is formed into a shape, and a claw piece $15_4$, $15_5$ is continuously provided in an end portion of each of parallelly extending walls of the shape. Also in this connecting piece $15_2$, the -shaped opening is expanded against the elastic force to fit it onto the groove-shaped end surface holding portion $16_3$, and the claw pieces $15_4$, $15_5$ are engaged with respective notched portions $16_5$, $16_6$.

Figure 8A:
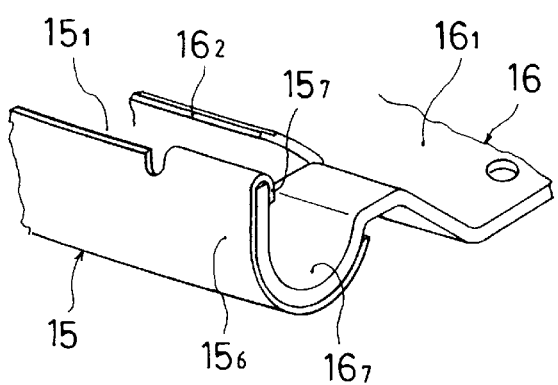
FIGS. 8A and 8B are perspective view and sectional view of an example with a different end surface holding portion.
Figure 8B:
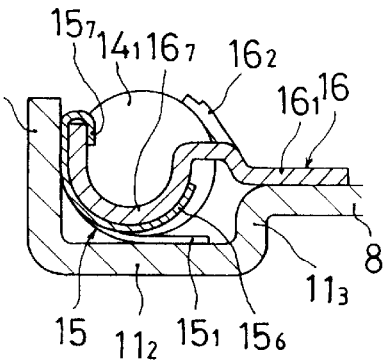

In the embodiment shown in FIGS. 8A and 8B, as a member to hold the end plates $14_1$ of the spring 14, the retainer 16 is continuously provided, on both circumferential ends thereof, with substantially semicircular, trough-shaped end surface holding portions $16_7$. On the other hand, the guide plate 15 is continuously provided, on both circumferential ends of the main portion $15_1$, with trough-shaped connecting pieces $15_6$. On a diametrically outer end portion of the connecting piece $15_6$, there are provided internally bent claws $15_7$. These connecting pieces $15_6$ are fit onto the trough-shaped end surface holding portions $16_7$ of the retainer 16 such that the bent claws $15_7$ are engaged and held with the diametrically outer edge of the trough-shaped end surface holding portions $16_7$.

Figure 9A:
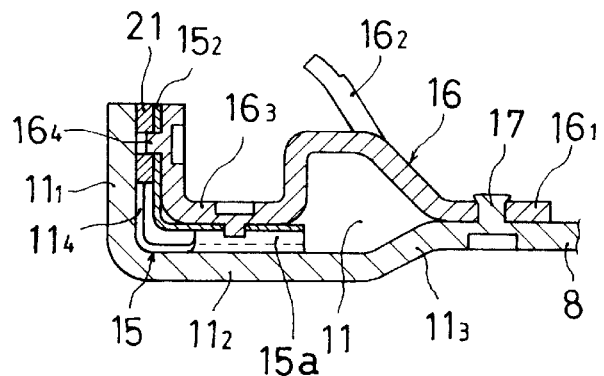
FIG. 9A is a sectional view of an example in which a balance weight is employed and FIG. 9B is a perspective view of the balance weight.
Figure 9B:
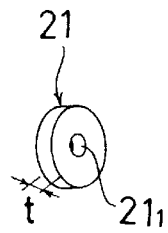

In the embodiment shown in FIGS. 9A and 9B, a balance weight 21 is fixed by utilizing a small projection $16_4$ which is provided in each of the groove-shaped end surface holding portions $16_3$ of the retainer 16. The length of the small projection $16_4$ is made larger than the thickness of the connecting piece $15_2$ of the guide plate 15 so that it slightly protrudes or projects out of the connecting piece $15_2$. The balance weight 21 is pushed into the clearance $11_4$ between an inner surface of the outer circumferential wall $11_1$ in the recessed portion 11 of the clutch plate 8 and a peripheral (outer side) surface of the connecting piece $15_2$. The thickness t of the balance weight 21 is equal to the width of the clearance $11_4$. In the center of the balance weight 21, there is a small hole $21_1$ into which the small projection $16_4$ is fit.

Once the weight or magnitude and the position of an unbalance are determined by measuring the dynamic balance of the clutch plate 8, a balance weight 21 that can cope with the unbalance is selected. In case there is available only a too heavy balance weight, it is cut to a required weight that can cope with the unbalance. The selected balance weight is then pushed into the clearance $11_4$. As a result of this pushing of the balance weight into the clearance $11_4$, the groove-shaped end surface holding portion $16_3$ or the outer circumferential wall $11_1$ is slightly deformed elastically, thereby allowing the balance weight 21 to slide over (or along) the end surface of the small projection $16_4$. When the small projection $16_4$ has been fit into the small hole $21_1$, the elastic deformation is restored back to its original state. The diameter of the balance weight 21 is preferably made smaller than the circumferential length of the groove-shaped end surface holding portion $16_3$. Also in this embodiment, the clutch plate 8 and the retainer 16 are connected together by pins 17 which are protruded out of the clutch plate 8.

The clutch plate 8 can be adjusted in its balance by adding the above-described balance weight 21. Therefore, there is no need of providing the notched portion 20 as shown in FIG. 5. In case cutting means is used to form the notched portion 20, there is a possibility that chips remain by adhering with constituting parts. In case a pressing machine is used for that purpose, the cut or sheared portion gives rise to a distortion in its neighborhood, resulting in a new unbalancing. On the other hand, if a balance weight 21 is added as in this embodiment, the above-described disadvantages can be eliminated.

Figure 10A:
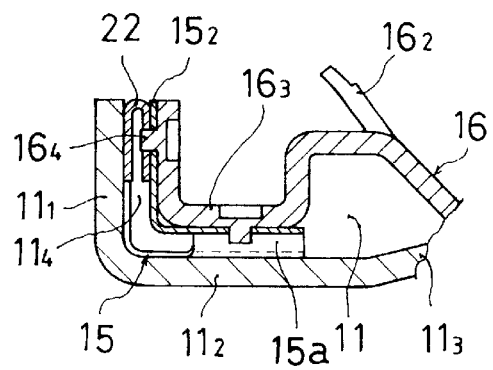
FIG. 10A is a sectional view of an example in which another balance weight is employed and FIG. 10B is a perspective view of the balance weight.
Figure 10B:
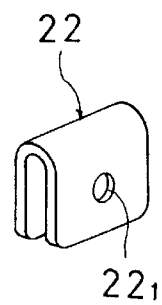

In the embodiment shown in FIGS. 10A and 10B, a U-shaped plate spring is used as a balance weight 22. A small hole $22_1$ is provided on one or both of the parallelly extending leg pieces of the U-shaped plate spring. The thickness between outer surfaces of the leg pieces of this balance weight 22 when it is free from an external force is made larger than the width of the clearance $14_4$. This balance weight 22 is pushed into the clearance $14_4$ by compressing it and is mounted by engaging the small projection $16_4$ into the small hole $22_1$.

Figure 11:
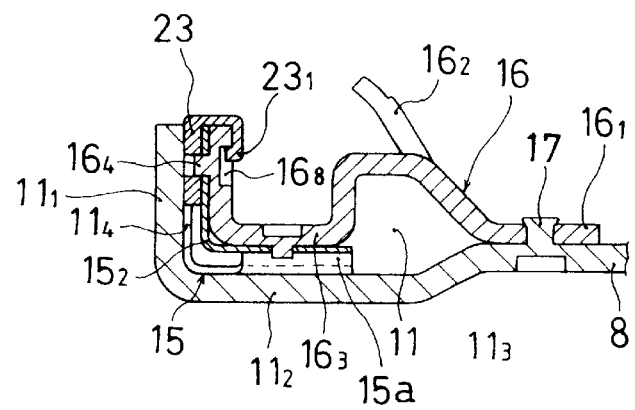
FIG. 11 is a sectional view of an example in which the balance weight in FIG. 10 is employed.

The balance weight 23 in the embodiment shown in FIG. 11 has a shape which is close to that of the balance weight 21 in FIG. 9, but has a hook-shaped engaging claw $23_1$ on one end. This engaging claw $23_1$ come into contact with the diametrically inner side of the edge of the groove-shaped end surface holding portion $16_3$. Its hooked end portion is engaged with a recessed portion $16_8$ which is generated when the small projection $16_4$ is formed or extruded, whereby the degree of engagement is enhanced. As a result, even if the small projection $16_4$ is small or even if a clearance exists between the balance weight 23 and the outer circumferential wall $11_1$, the fixing of the balance weight 23 can be made positively.

In each of the above-described embodiments, the clutch plate 8 and the retainer 16 are connected together by means of pins 17. However, they may also be connected by providing concentric holes in both the members 8, 16 and by inserting separate rivets therethrough and caulking them.

As explained hereinabove, the present invention has the following advantages. According to one aspect of the present invention, the guide plate is fixed by fitting the connecting pieces provided on circumferentially both ends thereof onto the end surface holding portion of the retainer. Since the guide plate is fixed not in the condition of being pinched between the clutch plate and the retainer, there is given no effect on the mounting of the clutch plate and the retainer even if there is a distortion due to heat-treatment. Further, since the guide plate is provided only in the necessary portion of contact between the guide plate and the spring, the apparatus can be made smaller and the overall weight thereof can be reduced.

According to another aspect of the present invention, since the connecting pieces of the guide plate are fit onto the groove-shaped end surface holding portions of the retainer and also are fixed by the engagement of the small projections with the small holes, there is an advantage that the connection becomes firmer.

According to still another aspect of the present invention, since the notched portions in the end surface holding portions of the retainer and the claw pieces of the connecting pieces of the guide plate can be formed simultaneously, the machining becomes easy.

According to still another aspect of the present invention, the fitting portion of the retainer and the guide plate is formed into a trough shape. Therefore, the adhesion between the two members can be made better. Still furthermore, since only the bent portion on one edge is engaged, the construction becomes simple.

According to still further aspect of the present invention, the balance weight is engaged by utilizing a small projection on the end surface holding portion of the retainer. Therefore, there is no need of partially cutting, by machine or by press, a constituting element for attaining dynamic balancing, with the result that there is no disadvantage in that chips by cutting remain or that distortion by cutting or shearing with a press does not occur.

It is readily apparent that the above-described apparatus for holding a spring of a clutch meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for holding a spring of a clutch comprising:

a guide plate which is disposed in an annular recessed portion on a rear side of a clutch plate;

a coil spring which circumferentially extends in contact with said guide plate; and a retainer which has a pair of end surface holding portions to contact both ends of said coil spring, and a peripheral holding portion to contact a periphery of said coil spring, said guide plate and said retainer being mounted on said clutch plate;

wherein a connecting piece is integrally provided on each circumferential end of said guide plate such that said connecting pieces are fit onto said end surface holding portions of said retainer.

2. An apparatus according to claim 1, wherein each of said end surface holding portions of said retainer is formed into a groove-shaped end surface holding portion which is open on the rear side, said groove-shaped end surface holding portions each having small projections of different directions formed on an external surface thereof, and wherein each of said connecting pieces of said guide plate is formed into a shape for fitting onto each of said groove-shaped end surface holding portions, said connecting pieces each having small holes to be respectively engaged with said small projections so as to connect said retainer and said guide plate together.

3. An apparatus according to claim 1, wherein each of said end surface holding portions of said retainer is formed into a groove-shaped end surface holding portion which is open on the rear side, said groove-shaped end surface holding portion each having a notched portion on a diametrically outer side and inner side, respectively, and wherein each of said connecting pieces of said guide plate is formed into a shape for fitting onto each of said groove-shaped end surface holding portions, said connecting piece having claw pieces to be respectively engaged with said notched portion so as to connect said retainer and said guide plate together.

4. An apparatus according to claim 1, wherein each of said end surface holding portions of said retainer is formed into a trough-shaped end surface holding portion which is open on the rear side, and wherein each of said connecting pieces of said guide plate is formed into a shape for fitting onto said trough-shaped end surface holding portion, said connecting pieces each having a bent portion to be engaged with an edge on diametrically outer side of said trough-shaped end surface holding portion so as to connect said retainer and said guide plate together.

5. An apparatus according to claim 2, wherein a clearance is provided between a diametrically inner surface in said annular recessed portion on the rear side of said clutch plate and a diametrically outer portion of said guide plate, wherein one of said small projections is formed to slightly protrude from a diametrically outer surface of said guide plate into said clearance, and wherein a balance weight having a small hole to be engaged with said small projection is inserted into said clearance to thereby engage said small opening with said small projection.

6. An apparatus according to claim 5, wherein said balance weight is formed into a plate spring of substantially U shape having a pair of parallelly extending leg portions with said small hole on one of said leg portions.

7. An apparatus according to claim 5, wherein said balance weight has a hook-shaped engaging claw on one end such that said engaging claw is engaged with that recess on said retainer which is formed by protrusion of said small projection.

* * * * *